(12) United States Patent
Jones et al.

(10) Patent No.: US 8,510,739 B2
(45) Date of Patent: Aug. 13, 2013

(54) SHARED REQUEST GROUPING IN A COMPUTING SYSTEM

(75) Inventors: Steven B. Jones, Poughkeepsie, NY (US); Nicholas C. Matasakis, Poughkeepsie, NY (US); Daniel V. Rosa, Highland, NY (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/883,512

(22) Filed: Sep. 16, 2010

(65) Prior Publication Data

US 2012/0072915 A1    Mar. 22, 2012

(51) Int. Cl.
*G06F 9/46*    (2006.01)

(52) U.S. Cl.
USPC .......................................................... 718/101

(58) Field of Classification Search
USPC .......................................................... 718/101
See application file for complete search history.

(56) References Cited

U.S. PATENT DOCUMENTS

| | | | |
|---|---|---|---|
| 5,226,143 | A | 7/1993 | Baird et al. |
| 5,263,161 | A | 11/1993 | Barth et al. |
| 5,805,900 | A | 9/1998 | Fagen et al. |
| 6,226,717 | B1 | 5/2001 | Reuter et al. |
| 6,449,614 | B1 | 9/2002 | Marcotte |
| 6,460,124 | B1 | 10/2002 | Kagi et al. |
| 6,681,241 | B1 | 1/2004 | Fagen et al. |
| 6,721,775 | B1 | 4/2004 | Fagen et al. |
| 7,228,351 | B2 | 6/2007 | Arwe |
| 2004/0139142 | A1 | 7/2004 | Arwe |
| 2004/0199734 | A1* | 10/2004 | Rajamani et al. .............. 711/163 |
| 2009/0222599 | A1 | 9/2009 | Lehr et al. |
| 2009/0222600 | A1 | 9/2009 | Lehr et al. |

* cited by examiner

*Primary Examiner* — Mengyao Zhe
(74) *Attorney, Agent, or Firm* — Cantor Colburn LLP; William A. Kinnaman, Jr.

(57) ABSTRACT

A queuing module is configured to determine the presence of at least one shared request in a request queue, and in the event at least one shared request is determined to be present in the queue; determine the presence of a waiting exclusive request located in the queue after the at least one shared request, and in the event a waiting exclusive request is determined to be located in the queue after the at least one shared request: determine whether grouping a new shared request with the at least one shared request violates a deferral limit of the waiting exclusive request; and, in the event grouping the new shared request with the at least one shared request does not violate the deferral limit of the waiting exclusive request, group the new shared request with the at least one shared request.

20 Claims, 12 Drawing Sheets

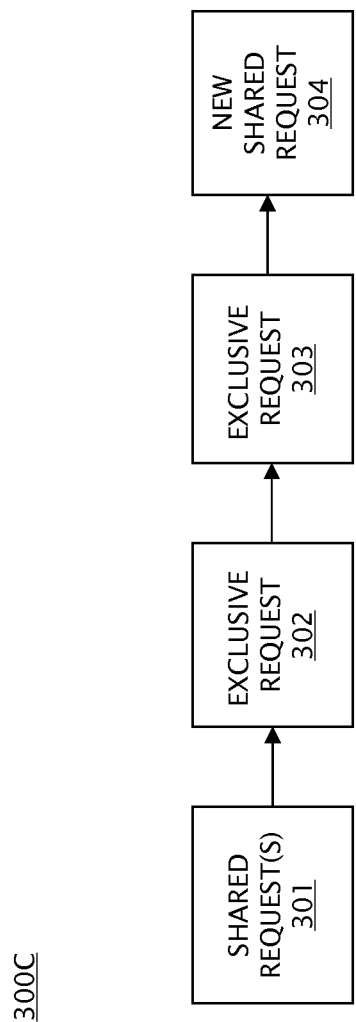

SHARED REQUEST GROUPING IN A COMPUTING SYSTEM

FIELD

This disclosure relates generally to the field of queuing of requests for serialization of resources in a computing system, and more specifically to grouping of shared requests in a queue of serialization requests.

DESCRIPTION OF RELATED ART

In a computing system, processes issue various requests for use of computing resources (such as processor time, memory space, or access to data) in the course of execution. Contending processes need to manage their use of a resource to prevent corruption of the resource. Usually, this is via some serial means of managing concurrent exclusive and shared requesters. Some resource management techniques include polling for resource availability, or queuing of requests for use of the resource. Without knowing how the resource is used, the serialization system may process the received requests in a first come, first served (FIFO) order. FIFO ordering ensures that if multiple consecutive resource requests are requested in the proper order (as defined by the design of the resource) that deadlock does not occur (i.e., a first request waiting for a first resource that cannot be granted due to a second request holding the first resource, while the second request waits for a second resource that is held by the first request), and that starvation (i.e., one request waiting indefinitely for a use of a resource that is repeatedly granted to other requests) of requests also does not occur.

In a z/OS global resource serialization (GRS) system, a request may have one of two scopes of resource ownership: exclusive or shared. Control of computing resources may be granted to one and only one exclusive request during execution of the exclusive request. Shared requests, on the other hand, may run in parallel with each other; control of the computing resources may be shared by multiple shared requests at a time. An exclusive request may be followed by an operation that changes the system environment or a system resource, such as a write operation; a shared request may include a request that does not change any system resource, but needs to ensure that the system environment does not change while it is processing, such as a read operation.

SUMMARY

In one aspect, a method for shared request grouping in a computing system includes receiving a new shared request for placement in a request queue by a queuing module; determining the presence of at least one shared request in the request queue by the queuing module, and in the event at least one shared request is determined to be present in the queue: determining the presence of a waiting exclusive request located in the queue after the at least one shared request by the queuing module, and in the event a waiting exclusive request is determined to be located in the queue after the at least one shared request: determining whether grouping the new shared request with the at least one shared request violates a deferral limit of the waiting exclusive request by the queuing module; and in the event grouping the new shared request with the at least one shared request does not violate the deferral limit of the waiting exclusive request, grouping the new shared request with the at least one shared request by the queuing module.

In another aspect, a computer program product comprising a computer readable storage medium containing computer code that, when executed by a computer, implements a method for shared request grouping, wherein the method includes receiving a new shared request for placement in a request queue; determining the presence of at least one shared request in the request queue, and in the event at least one shared request is determined to be present in the queue: determining the presence of a waiting exclusive request located in the queue after the at least one shared request, and in the event a waiting exclusive request is determined to be located in the queue after the at least one shared request: determining whether grouping the new shared request with the at least one shared request violates a deferral limit of the waiting exclusive request; and, in the event grouping the new shared request with the at least one shared request does not violate the deferral limit of the waiting exclusive request, grouping the new shared request with the at least one shared request.

In another aspect, a queuing module for a computing system is configured to: receive a new shared request for placement in a request queue; determine the presence of at least one shared request in the request queue, and in the event at least one shared request is determined to be present in the queue; determine the presence of a waiting exclusive request located in the queue after the at least one shared request, and in the event a waiting exclusive request is determined to be located in the queue after the at least one shared request: determine whether grouping the new shared request with the at least one shared request violates a deferral limit of the waiting exclusive request; and, in the event grouping the new shared request with the at least one shared request does not violate the deferral limit of the waiting exclusive request, group the new shared request with the at least one shared request.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 3A-C are schematic block diagrams illustrating further embodiments of a request queue.

DETAILED DESCRIPTION

Figure 1:
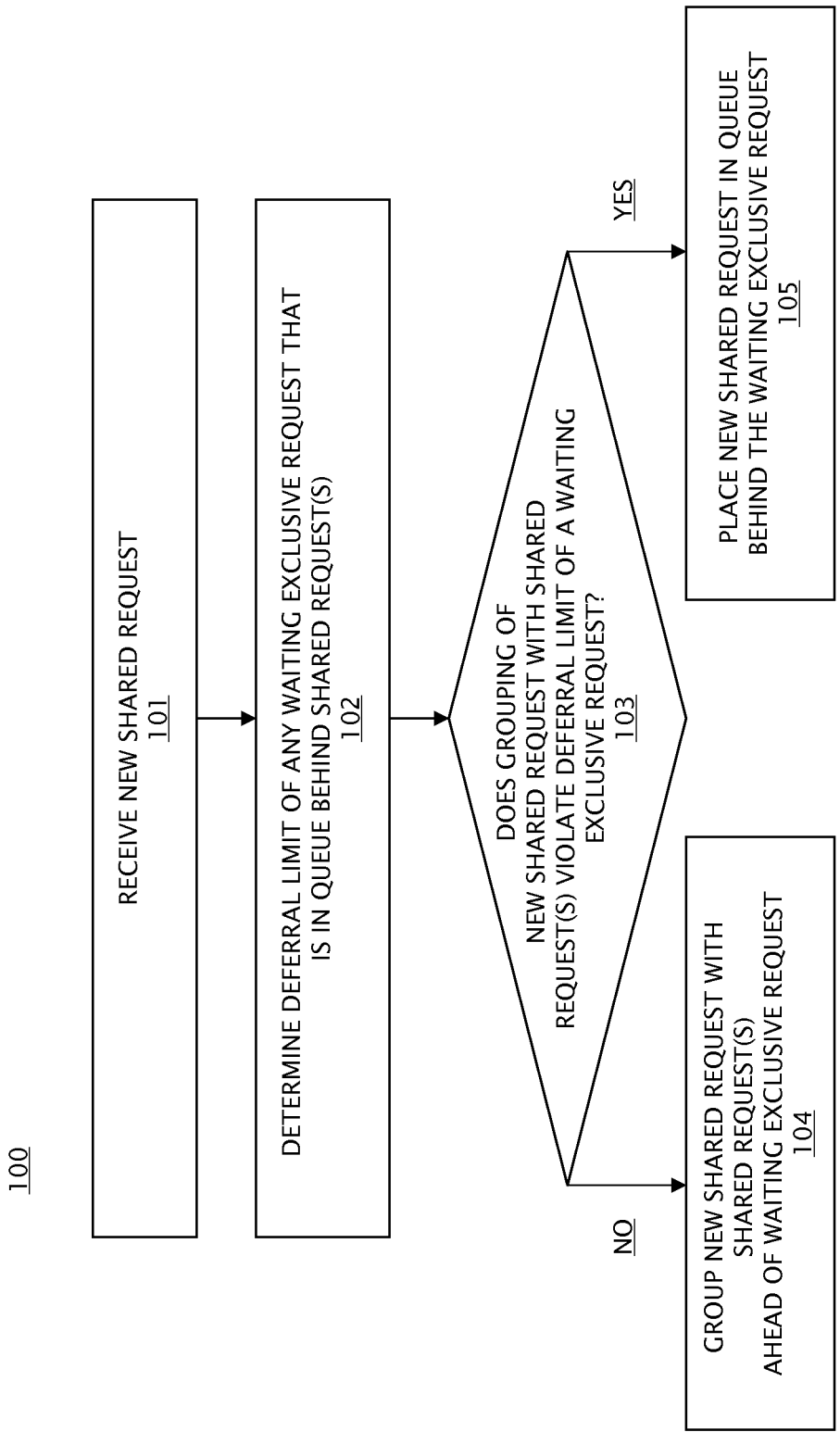
FIG. 1 is a flow diagram illustrating an embodiment of a method for shared request grouping in a computing system.

Embodiments of methods for shared request grouping for a queuing module in a computing system are provided, with exemplary embodiments being discussed below in detail. If exclusive and shared requests arrive alternately in a first come, first served queuing system, low parallelism of shared request execution may result, with many shared requests executing alone due to placement in the queue between two exclusive requests. This may significantly slow process execution and reduce efficiency of use of resources in the computing system. However, expediting of grouping shared requests together may ensure that multiple shared requests are executed in parallel, improving overall request throughput. Also, if one or more shared requests are currently executing and a new shared request is added to the one or more shared requests while they are executing, overall system performance is improved, as a process issuing the new shared request may not have to change context due to the expedited execution of the new shared request. To accomplish this shared request grouping, waiting exclusive requests may be tagged as deferrable, with an associated deferral limit. The queuing module may group a newly received shared request with one or more shared requests that are located in the request queue in front of a waiting exclusive request, so long as the deferral limit of the waiting exclusive request is not violated by grouping the new shared request with the one or more queued shared requests. The definition of deferral limits for exclusive requests avoids starvation of exclusive requests. Appropriate designation of deferral limits for exclusive requests may allow grouping of all outstanding shared requests together, making efficient use of system resources.

The deferral limit for an exclusive request may designate a maximum number of requests that are permitted to be queued ahead of the exclusive request before execution of the exclusive request in some embodiments. In some embodiments, the deferral limit may designate a number of requests permitted to be in the queue ahead of the exclusive request, regardless of when the requests ahead of the exclusive request joined the queue, or the deferral limit may refer to a number of later-arriving shared requests that are allowed to jump ahead of the exclusive request, in which case a count of later-arriving shared requests that are moved ahead of the exclusive request may be kept. In other embodiments, the deferral limit may designate a maximum total amount of time the exclusive request may wait in the queue before execution, or a maximum permitted amount of waiting time that is attributable to moving later-arriving shared requests ahead of the exclusive request. The deferral limit for an exclusive request may be designated on a per request basis (based on, for example, the process issuing the exclusive request) in some embodiments, or may be a default value for all exclusive requests in the queuing system in other embodiments.

FIG. 1 illustrates an embodiment of a method 100 for shared request grouping. The method 100 may be implemented in a queuing module in a computing system. In block 101, a new shared request is received by the queuing module. In block 102, it is determined if there are one or more shared requests already in the queue with which the new shared request may be grouped. In various embodiments, the one or more shared requests already in the queue may be waiting in the queue, or may be currently executing. It is then determined if there are any waiting exclusive requests located in the queue after the one or more shared requests; the respective deferral limit for each waiting exclusive request located in the queue after the one or more queued shared requests is determined. The deferral limit may designate a total maximum number of requests that are permitted to be ahead of the exclusive request in the queue, or a number of shared requests that are permitted to jump ahead of the exclusive request in the queue. The deferral limit may alternately designate a maximum amount of time the exclusive request is permitted to wait before execution. In various embodiments, the deferral limit for an exclusive request may be a default value for all exclusive requests in the queuing system, or may be designated for individual exclusive requests based on, for example, the process that issued the exclusive request. Then, in block 103, any deferral limits determined in block 102 are used to determine whether grouping the new shared request with the one or more shared requests violates the deferral limit of any of the waiting exclusive requests. A number of requests in the queue ahead of each waiting exclusive request, a count of shared requests that have been moved up in the queue, or an amount of time required to execute the new shared request in parallel with the one or more shared requests, may be used to make this determination. If it is determined in block 103 that grouping the new shared request with the one or more shared requests does not violate the deferral limit of any waiting exclusive request, the new shared request is grouped in the queue with the one or more shared requests in block 104, and the new shared request will execute with the grouped shared requests before the waiting exclusive requests. If it is determined in block 103 that grouping the shared request with the one or more shared requests violates the deferral limit of a waiting exclusive request, then the new shared request is placed in the queue after the waiting exclusive request in block 105. This may comprise placing the new shared request at the end of the queue in some embodiments, or grouping the new shared request with one or more other shared requests that are located in the queue after the waiting exclusive request in other embodiments (i.e., subject to the determination of block 103); placement of the new shared request is performed such that the deferral limit of no exclusive request in the queue is violated.

Figure 2A:
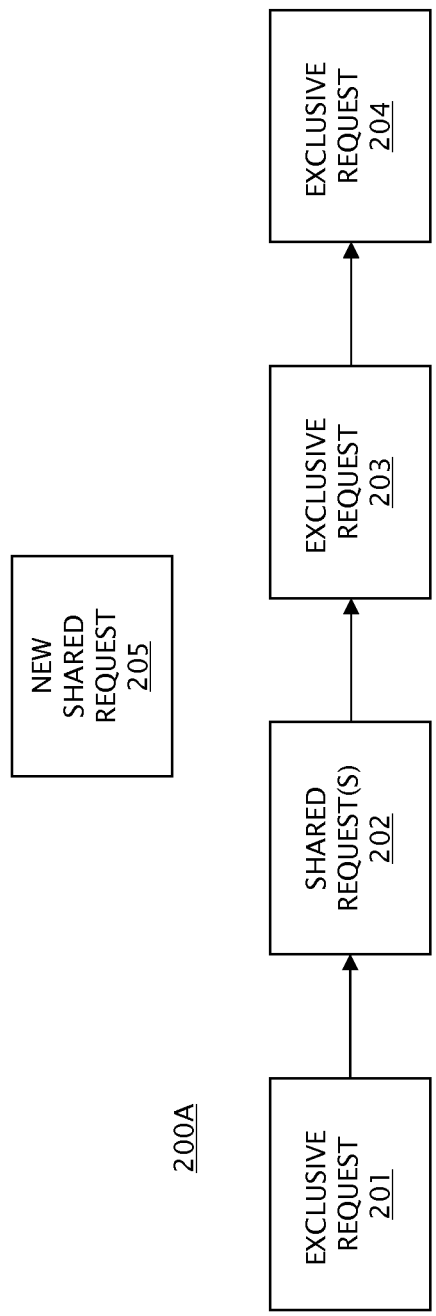
FIG. 2A-C are schematic block diagrams illustrating embodiments of a request queue.
Figure 2B:
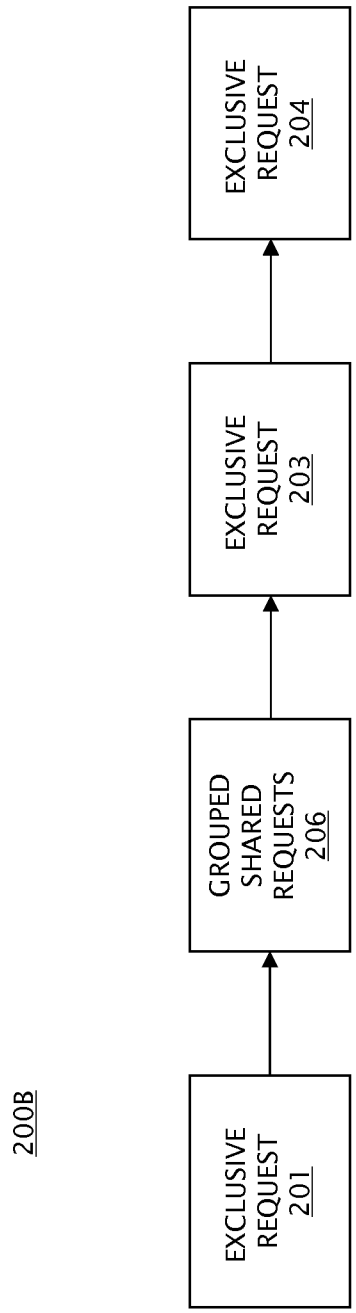
Figure 2C:
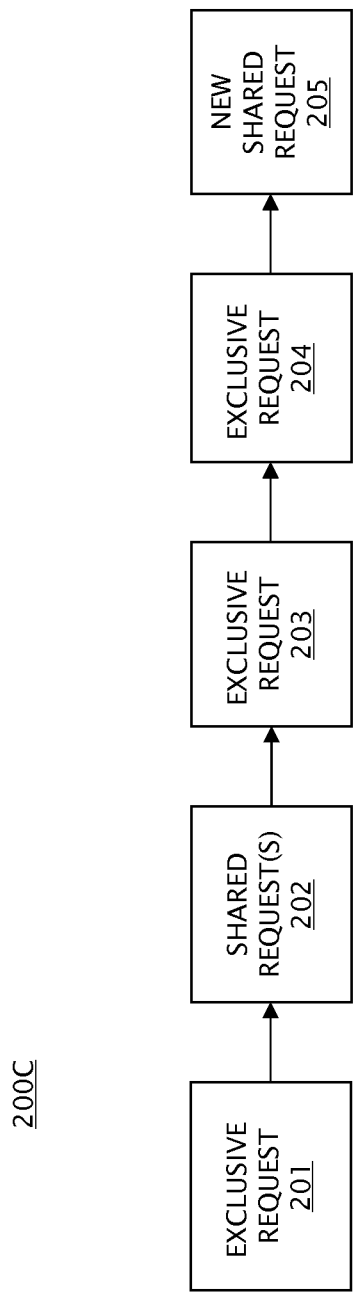

Application of method 100 is illustrated below with respect to FIGS. 2A-C, 3A-C, and 4A-D. FIG. 2A illustrates an embodiment of a request queue 200A. Request queue 200A includes exclusive request 201 at the front of the queue 200A, shared request(s) 202, and waiting exclusive requests 203-204. Each of exclusive requests 201, 203, and 204 has an associated deferral limit. In various embodiments, shared request(s) 202 may include one shared request, or a plurality of grouped shared requests. Referring again to FIG. 1, when a new shared request 205 is received by a queuing module for the request queue 200 (block 101), the queuing module determines the respective deferral limits for each of waiting exclusive requests 203-204 (block 102), as waiting exclusive requests 203-204 are located after shared request(s) 202 in the request queue 200A. It is then determined if grouping the new shared request 205 with shared request(s) 202 and executing the grouped shared requests in parallel violates the respective deferral limits of either of waiting exclusive requests 203-204 (block 103). If grouping the new shared request 205 with shared request(s) 202 and executing the grouped shared requests in parallel does not violate the respective deferral limits of either of waiting exclusive requests 203-204, then the new shared request 205 is grouped with shared request(s) 202 to form grouped shared requests 206 (block 104), as shown in updated queue 200B of FIG. 2B. The grouped shared requests 206 are executed in parallel when they arrive at the front of the queue (in this example, after completion of exclusive request 201). Otherwise, the new shared request 205 is placed at the end of the queue after exclusive request 204 (block 105), as shown in updated queue 200C of FIG. 2C. Request queue 200A and updated queues 200B-C are shown for illustrative purposes only; a request queue may include any number of exclusive requests, and any number of grouped or ungrouped shared requests in various embodiments, subject to the method 100 outlined in FIG. 1.

Figure 3A:
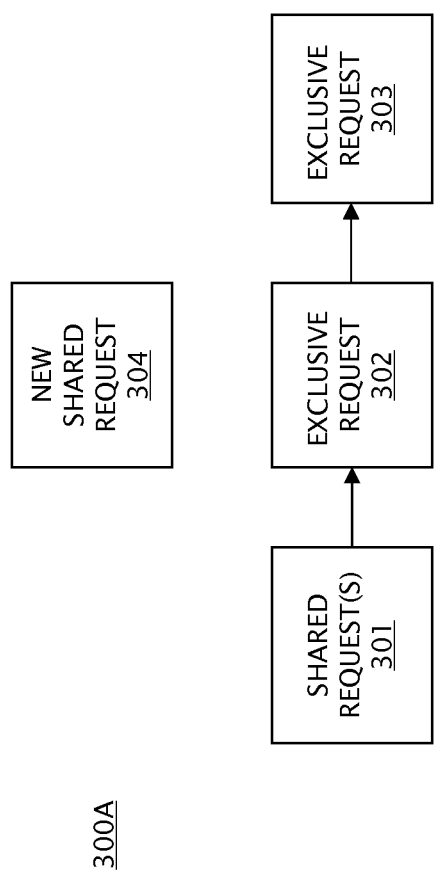
Figure 3B:
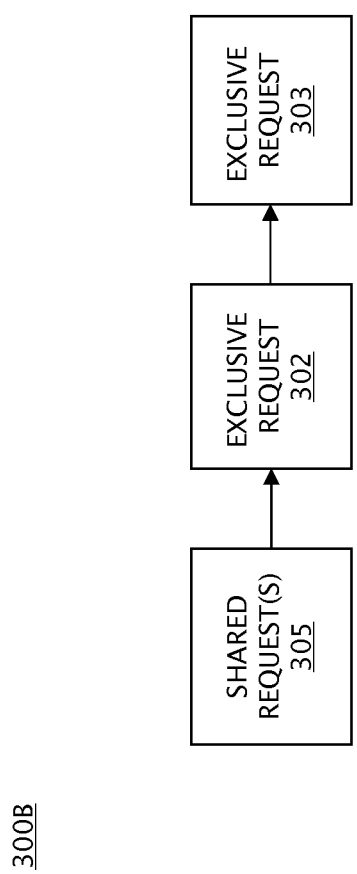

FIG. 3A illustrates another embodiment of a request queue 300A. Request queue 300A includes shared request(s) 301 at the front of the queue 300A (i.e., shared request(s) 301 are currently executing), and waiting exclusive requests 302-303. Each of exclusive requests 302-303 has an associated deferral limit. In various embodiments, shared request(s) 301 may include one shared request, or a plurality of grouped shared requests. Referring again to FIG. 1, when a new shared request 304 is received by a queuing module for the request queue 300A (block 101), the queuing module determines the respective deferral limits for each of waiting exclusive requests 302-303 (block 102), as waiting exclusive requests 302-303. are located after shared request(s) 301 in the request queue 300A. It is then determined if grouping the new shared request 304 with shared request(s) 301 and executing the grouped shared requests in parallel violates the respective deferral limits of either of waiting exclusive requests 302-303 (block 103). If grouping the new shared request 304 with shared request(s) 301 and executing the grouped shared requests in parallel does not violate the respective deferral limits of either of waiting exclusive requests 302-303, then the new shared request 304 is grouped with shared request(s) 301 to form grouped shared requests 305 (block 104), as shown in updated queue 300B of FIG. 3B. The grouped shared requests 305 are executed in parallel, allowing the process issuing the new shared request 304 to not have to change context (i.e., suspend or resume), as the process may continue to execute with the expedited execution of new shared request 304. Otherwise, the new shared request 304 is placed at the end of the queue after exclusive request 303 (block 105), as shown in updated queue 300C of FIG. 3C. Request queue 300A and updated queues 300B-C are shown for illustrative purposes only; a request queue may include any number of exclusive requests, and any number of grouped or ungrouped shared requests in various embodiments, subject to the method 100 outlined in FIG. 1.

Figure 4A:
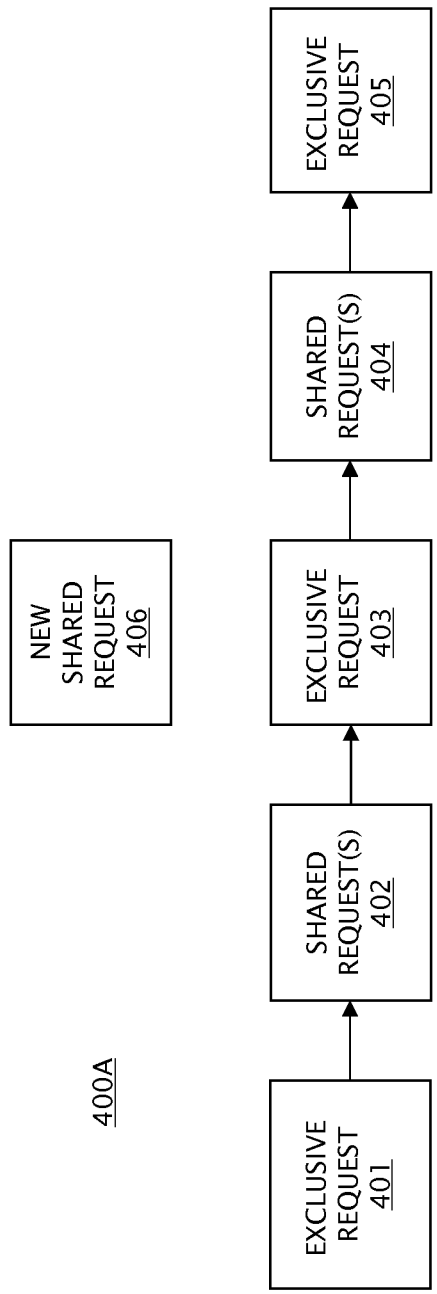
FIG. 4A-D are schematic block diagrams illustrating further embodiments of a request queue.
Figure 4B:
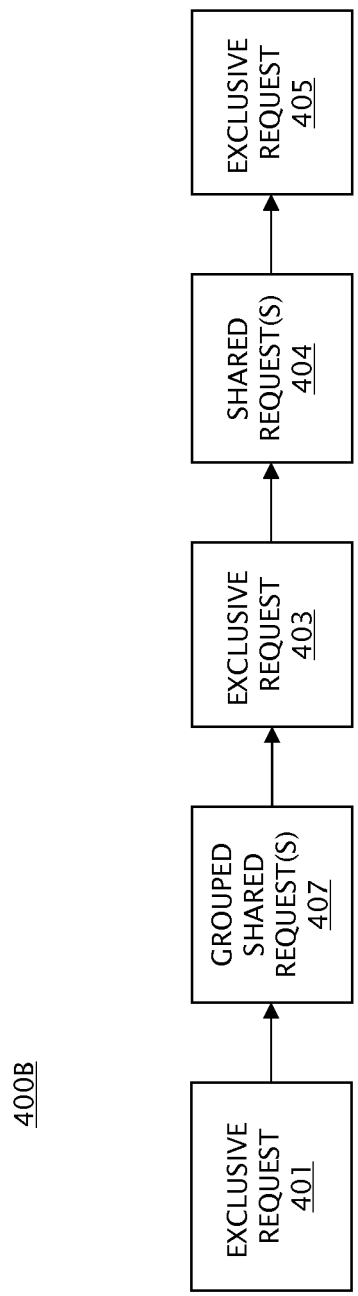
Figure 4C:
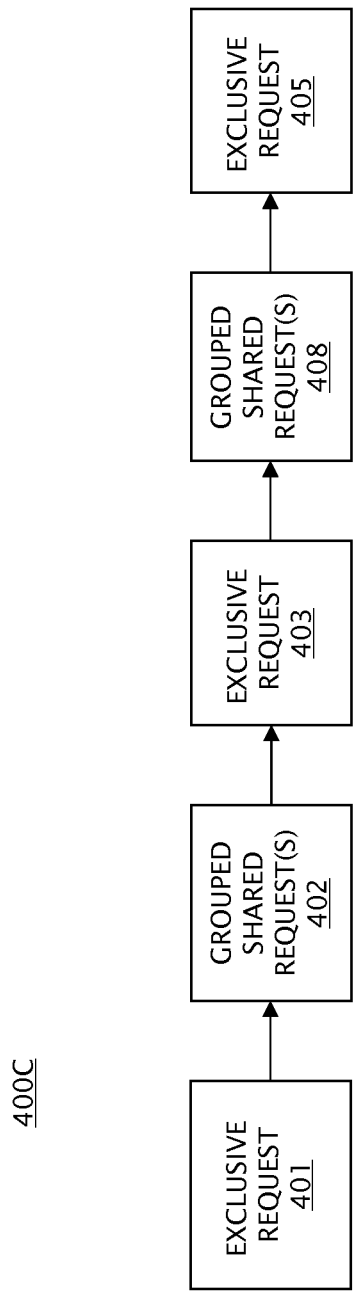
Figure 4D:
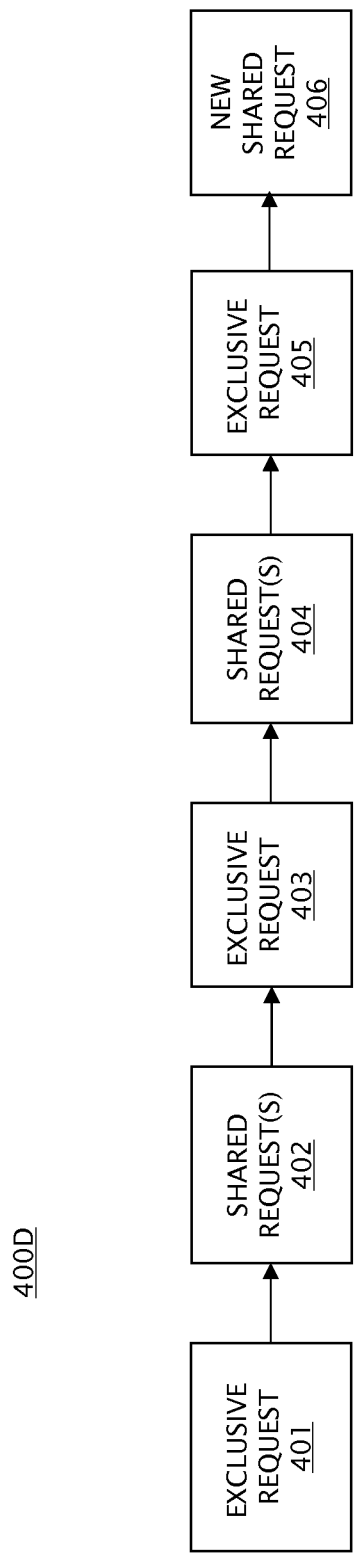

FIG. 4A illustrates another embodiment of a request queue 400A. Request queue 400A includes exclusive request 401 at the front of the queue 400A, shared request(s) 402, waiting exclusive request 403, shared request(s) 404, and exclusive request 405. Each of exclusive requests 401, 403, and 405 has an associated deferral limit. In various embodiments, each of shared request(s) 402 and 404 may include one shared request, or a plurality of grouped shared requests. Referring again to FIG. 1, when a new shared request 406 is received by a queuing module for the request queue 400A (block 101), the queuing module determines the respective deferral limits for each of waiting exclusive requests 403 and 405 (block 102), as waiting exclusive requests 403 is located after shared request(s) 402, and waiting exclusive requests 405 is located after shared request(s) 402 and 404. It is then determined if grouping the new shared request 406 with shared request(s) 402 or with shared request(s) 404 violates the respective deferral limits of either of waiting exclusive requests 403 or 405 (block 103). If grouping the new shared request 406 with shared request(s) 402 and executing the grouped shared requests in parallel does not violate the respective deferral limits of either of waiting exclusive requests 403 or 405, then the new shared request 406 is grouped with shared request(s) 402 to form grouped shared requests 407 (block 104), as shown in updated queue 400B of FIG. 4B. The grouped shared requests 407 are executed in parallel when they arrive at the front of the queue (in this example, after completion of exclusive request 401, and before exclusive requests 403 and 405). If grouping new shared request 406 with shared request (s) 402 violates the deferral limit of exclusive request 403, but does not violate the deferral limit of exclusive request 405, the new shared request 406 is grouped with shared request(s) 404 ahead of exclusive request 405 but behind exclusive request 403, forming grouped shared requests 408, as shown in updated queue 400C of FIG. 4C. If grouping the new shared request 406 with either of shared request(s) 402 or 404 violates the deferral limit of exclusive request 405, the new shared request 406 is placed at the end of the queue after exclusive request 405 (block 105), as shown in updated queue 400D of FIG. 4D. As illustrated by FIGS. 4A-D, a new shared request will be grouped in the queue with the first shared request(s) in the queue that may be grouped with the new shared request without violating the deferral limit of any waiting exclusive request, or the new shared request will be placed at the end of the queue. Request queue 400A and updated queues 400B-D are shown for illustrative purposes only; a request queue may include any number of exclusive requests, and any number of grouped or ungrouped shared requests in various embodiments, subject to the method 100 outlined in FIG. 1.

Figure 5:
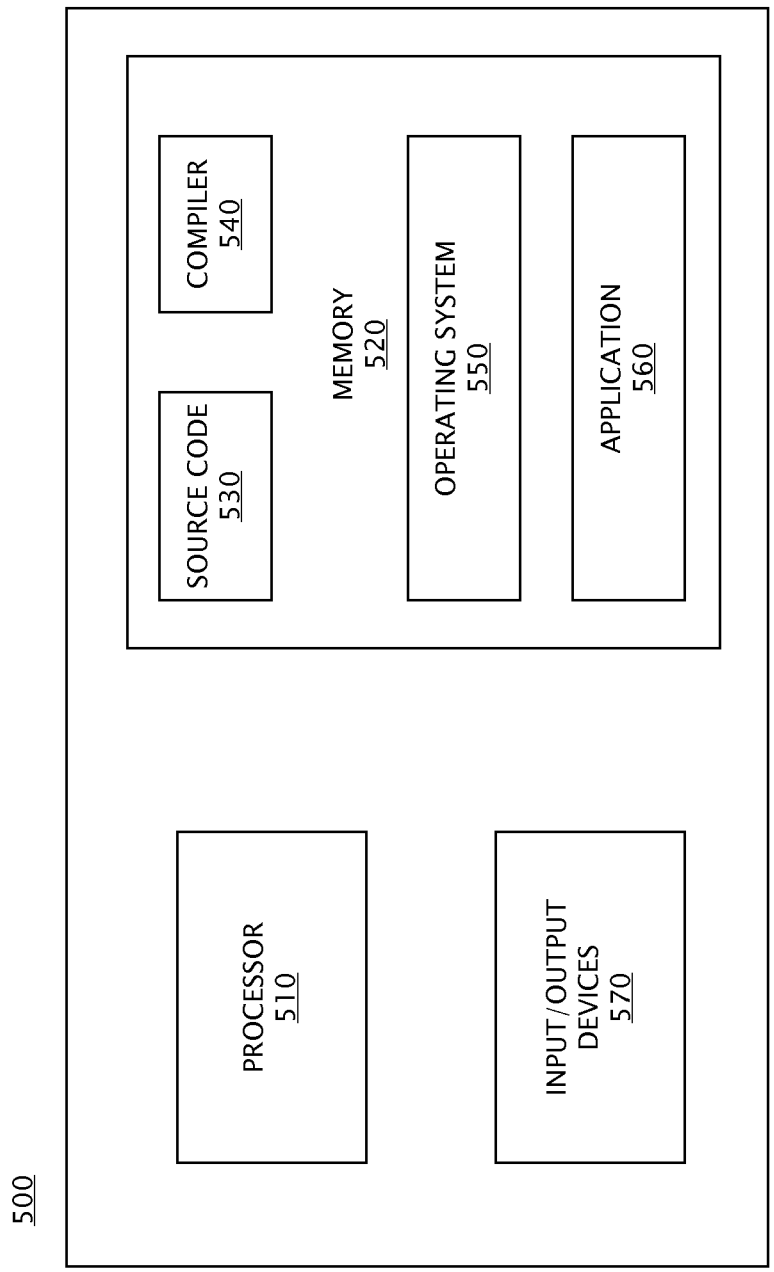
FIG. 5 is a schematic diagram illustrating an embodiment of a computing system in which a method for shared request grouping may be implemented.

FIG. 5 illustrates an example of a computer 500 which may be utilized by exemplary embodiments of a method for shared request grouping and exclusive request deferral as embodied in software. Various operations discussed above may utilize the capabilities of the computer 500. One or more of the capabilities of the computer 500 may be incorporated in any element, module, application, and/or component discussed herein. For example, a queuing module that implements method 100 of FIG. 1 may be implemented in operating system 550, and exclusive and shared requests handled by the queuing module may be executed by processor 570.

The computer 500 includes, but is not limited to, personal computers (PCs), workstations, laptops, PDAs, palm devices, servers, storages, and the like. Generally, in terms of hardware architecture, the computer 500 may include one or more processors 510, memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include improvement of parallelization and throughput in a computing system.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for shared request grouping in a computing system, the method comprising:
   receiving a new shared request for placement in a request queue by a queuing module;
   determining the presence of at least one shared request in the request queue by the queuing module, and based on determining that at least one shared request is present in the queue:
   determining the presence of a waiting exclusive request located in the queue after the at least one shared request by the queuing module, and based on determining that a waiting exclusive request is in the queue after the at least one shared request:
   determining whether grouping the new shared request with the at least one shared request exceeds a deferral limit of the waiting exclusive request by the queuing module, wherein the deferral limit comprises one of: a maximum number of requests that are permitted to be queued ahead of the exclusive request before execution of the exclusive request, a number of later-arriving shared requests that are permitted to jump ahead of the exclusive request in the queue, a maximum total amount of time the exclusive request is permitted to wait in the queue before execution of the exclusive request, and a maximum permitted amount of waiting time for the exclusive request that is permitted to occur based on moving of later-arriving shared requests ahead of the exclusive request in the queue; and
   based on determining that grouping the new shared request with the at least one shared request does not exceed the deferral limit of the waiting exclusive request, grouping the new shared request with the at least one shared request by the queuing module.

2. The method of claim 1, further comprising executing the new shared request and the at least one shared request in parallel before executing the waiting exclusive request by the computing system.

3. The method of claim 1, further comprising:
   based on determining that grouping the new shared request with the at least one shared request exceeds the deferral limit of the waiting exclusive request, placing the new shared request in the queue after the waiting exclusive request by the queuing module.

4. The method of claim 1, wherein the deferral limit of a waiting exclusive request comprises a maximum number of requests that are permitted to execute before the waiting exclusive request, and wherein determining whether grouping the new shared request with the at least one shared request exceeds the deferral limit of the waiting exclusive request by the queuing module comprises:
   determining the deferral limit of the waiting exclusive request by the queuing module;
   determining a number of requests in the queue ahead of the waiting exclusive request by the queuing module;
   based on determining that the number of requests in the queue ahead of the waiting exclusive request is less than or equal to the deferral limit of the waiting exclusive request if the new shared request is grouped with the at least one shared request, determining that grouping the new shared request with the at least one shared request does not exceed the deferral limit by the queuing module; and
   based on determining that that the number of requests in the queue ahead of the waiting exclusive request is greater than the deferral limit of the waiting exclusive request if the new shared request is grouped with the at least one shared request, determining that grouping the new shared request with the at least one shared request exceeds the deferral limit by the queuing module.

5. The method of claim 1, wherein the deferral limit of a waiting exclusive request comprises a maximum number of later-arriving shared requests that are permitted to be grouped in front of the waiting exclusive request, and wherein determining whether grouping the new shared request with the at least one shared request exceeds the deferral limit of the waiting exclusive request by the queuing module comprises:
   determining the deferral limit of the waiting exclusive request by the queuing module;
   determining a number of later-arriving shared requests in the queue that have been grouped in front of the waiting exclusive request by the queuing module;
   based on determining that the number of later-arriving shared requests in the queue that have been grouped in front of the waiting exclusive request is less than the deferral limit of the waiting exclusive request if the new shared request is grouped with the at least one shared request, determining that grouping the new shared request with the at least one shared request does not exceed the deferral limit by the queuing module; and
   based on determining that the number of later-arriving shared requests in the queue that have been grouped in front of the waiting exclusive request is greater than the deferral limit of the waiting exclusive request if the new shared request is grouped with the at least one shared request, determining that grouping the new shared request with the at least one shared request exceeds the deferral limit by the queuing module.

6. The method of claim 1, wherein the deferral limit of a waiting exclusive request comprises a maximum amount of time that the waiting exclusive request is permitted to wait before execution, and wherein determining whether grouping the new shared request with the at least one shared request exceeds the deferral limit of the waiting exclusive request by the queuing module comprises:
   determining the deferral limit of the waiting exclusive request by the queuing module;
   determining whether the waiting exclusive request will be executed before expiration of the deferral limit if the new shared request is grouped with the at least one shared request by the queuing module;
   based on determining that that the waiting exclusive request will be executed before expiration of the deferral limit if the new shared request is grouped with the at least one shared request, determining that grouping the new shared request with the at least one shared request does not exceed the deferral limit by the queuing module; and
   based on determining that the waiting exclusive request will not be executed before expiration of the deferral limit if the new shared request is grouped with the at least one shared request, determining that grouping the new shared request with the at least one queued shared request exceeds the deferral limit by the queuing module.

7. The method of claim 1, wherein the deferral limit of a waiting exclusive request comprises a maximum permitted amount of waiting time for the exclusive request that is attributable to later-arriving shared requests being grouped ahead of the waiting exclusive request, and wherein determining whether grouping the new shared request with the at least one shared request exceeds the deferral limit of the waiting exclusive request by the queuing module comprises:

determining the deferral limit of the waiting exclusive request by the queuing module;

determining an amount of waiting time for the exclusive request that is attributable to later-arriving shared requests being grouped ahead of the waiting exclusive request if the new shared request is grouped with the at least one shared request by the queuing module;

based on determining that the amount of waiting time for the exclusive request that is attributable to later-arriving shared requests being grouped ahead of the waiting exclusive request if the new shared request is grouped with the at least one shared request is less than the deferral limit, determining that grouping the new shared request with the at least one shared request does not exceed the deferral limit by the queuing module; and based on determining that the amount of waiting time for the exclusive request that is attributable to later-arriving shared requests being grouped ahead of the waiting exclusive request if the new shared request is grouped with the at least one shared request is greater than the deferral limit, determining that grouping the new shared request with the at least one queued shared request exceeds the deferral limit by the queuing module.

8. The method of claim 1, wherein the deferral limit of the waiting exclusive request is designated based on an issuer of the exclusive request.

9. The method of claim 1, wherein the deferral limit of the waiting exclusive request is a default value set by the queuing module.

10. A computer program product comprising a non-transitory computer readable storage medium containing computer code that, when executed by a computer, implements a method for shared request grouping, wherein the method comprises:

receiving a new shared request for placement in a request queue, and based on receiving the new shared request for placement in the request queue:

determining the presence of at least one shared request in the request queue, and based on determining that at least one shared request is present in the queue:

determining the presence of a waiting exclusive request located in the queue after the at least one shared request, and based on determining that a waiting exclusive request is located in the queue after the at least one shared request:

determining whether grouping the new shared request with the at least one shared request exceeds a deferral limit of the waiting exclusive request, wherein the deferral limit comprises one of: a maximum number of requests that are permitted to be queued ahead of the exclusive request before execution of the exclusive request, a number of later-arriving shared requests that are permitted to jump ahead of the exclusive request in the queue, a maximum total amount of time the exclusive request is permitted to wait in the queue before execution of the exclusive request, and a maximum permitted amount of waiting time for the exclusive request that is permitted to occur based on moving of later-arriving shared requests ahead of the exclusive request in the queue; and based on determining that grouping the new shared request with the at least one shared request does not exceed the deferral limit of the waiting exclusive request, grouping the new shared request with the at least one shared request.

11. The computer program product according to claim 10, further comprising executing the new shared request and the at least one shared request in parallel before executing the waiting exclusive request by the computing system.

12. The computer program product according to claim 10, further comprising:

based on determining that grouping the new shared request with the at least one shared request exceeds the deferral limit of the waiting exclusive request, placing the new shared request in the queue after the waiting exclusive request.

13. The computer program product according to claim 10, wherein the deferral limit of a waiting exclusive request comprises a maximum number of requests that are permitted to execute before the waiting exclusive request, and wherein determining whether grouping the new shared request with the at least one shared request exceeds the deferral limit of the waiting exclusive request comprises:

determining the deferral limit of the waiting exclusive request;

determining a number of requests in the queue ahead of the waiting exclusive request;

based on determining that the number of requests in the queue ahead of the waiting exclusive request is less than the deferral limit of the waiting exclusive request if the new shared request is grouped with the at least one shared request, determining that grouping the new shared request with the at least one shared request does not exceed the deferral limit; and based on determining that the number of requests in the queue ahead of the waiting exclusive request is greater than the deferral limit of the waiting exclusive request if the new shared request is grouped with the at least one shared request, determining that grouping the new shared request with the at least one shared request exceeds the deferral limit.

14. The computer program product according to claim 10, wherein the deferral limit of a waiting exclusive request comprises a maximum amount of time that the waiting exclusive request is permitted to wait before execution, and wherein determining whether grouping the new shared request with the at least one shared request exceeds the deferral limit of the waiting exclusive request comprises:

determining the deferral limit of the waiting exclusive request;

determining whether the waiting exclusive request will be executed before expiration of the deferral limit if the new shared request is grouped with the at least one shared request;

based on determining that the waiting exclusive request will be executed before expiration of the deferral limit if the new shared request is grouped with the at least one shared request, determining that grouping the new shared request with the at least one shared request does not exceed the deferral limit; and based on determining that the waiting exclusive request will not be executed before expiration of the deferral limit if the new shared request is grouped with the at least one shared request, determining that grouping the new shared request with the at least one shared request exceeds the deferral limit.

15. The computer program product according to claim 10, wherein the deferral limit of the waiting exclusive request is designated based on an issuer of the exclusive request.

16. The computer program product according to claim 10, wherein the deferral limit of the waiting exclusive request is a default value.

17. A computing system comprising:
- a processor;
- a memory; and
- a queuing module configured to:
  - receive a new shared request for placement in a request queue in the memory;
  - determine the presence of at least one shared request in the request queue, and based on determining that at least one shared request is present in the queue:
  - determine the presence of a waiting exclusive request located in the queue after the at least one shared request, and based on determining that a waiting exclusive request is located in the queue after the at least one shared request:
  - determine whether grouping the new shared request with the at least one shared request exceeds a deferral limit of the waiting exclusive request, wherein the deferral limit comprises one of: a maximum number of requests that are permitted to be queued ahead of the exclusive request before execution of the exclusive request by the processor, a number of later-arriving shared requests that are permitted to jump ahead of the exclusive request in the queue, a maximum total amount of time the exclusive request is permitted to wait in the queue before execution of the exclusive request, and a maximum permitted amount of waiting time for the exclusive request that is permitted to occur based on moving of later-arriving shared requests ahead of the exclusive request in the queue; and
  - based on determining that grouping the new shared request with the at least one shared request does not exceed the deferral limit of the waiting exclusive request, group the new shared request with the at least one shared request.

18. The queuing module of claim 17, further configured to: based on determining that grouping the new shared request with the at least one shared request exceeds the deferral limit of the waiting exclusive request, placing the new shared request in the queue after the waiting exclusive request.

19. The computing system of claim 17, wherein the deferral limit of the waiting exclusive request is designated based on an issuer of the exclusive request.

20. The computing system of claim 17, wherein the deferral limit of the waiting exclusive request is a default value by the queuing module.

* * * * *